UNITED STATES PATENT OFFICE.

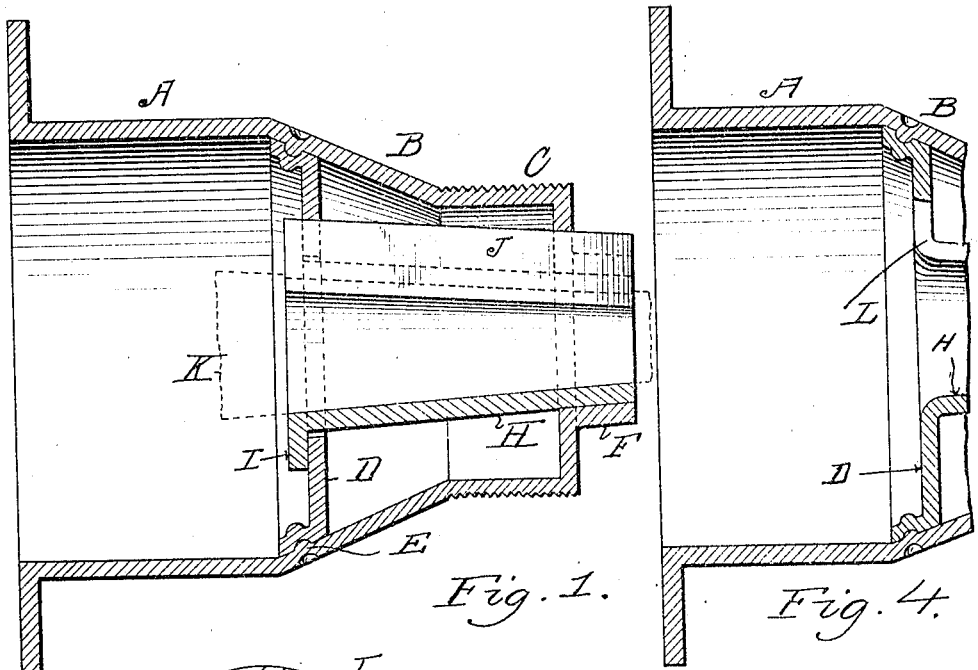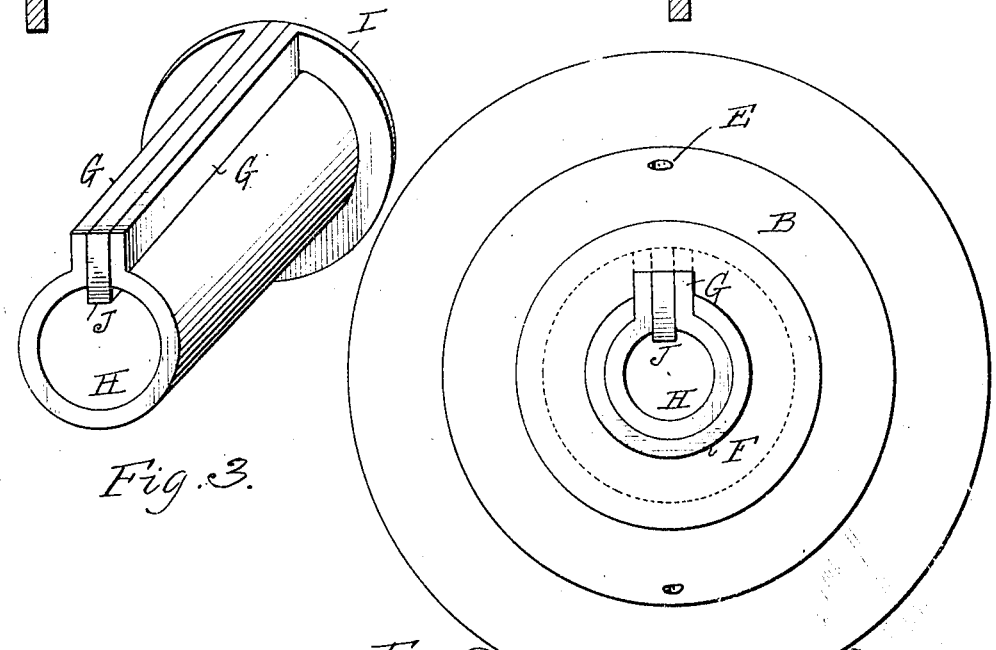

THOMAS E. MURRAY, OF NEW YORK, N. Y.

HUB FOR METAL VEHICLE-WHEELS.

1,206,888.  Specification of Letters Patent.  Patented Dec. 5, 1916.

Application filed May 29, 1916. Serial No. 100,576.

*To all whom it may concern:*

Be it known that I, THOMAS E. MURRAY, a citizen of the United States, residing at New York, in the county of New York and State of New York, have invented a certain new and useful Improvement in Hubs for Metal Vehicle-Wheels, of which the following is a specification.

The invention relates to a hub for metal vehicle wheels, and consists in the construction of said hub, whereby the same is simplified and cheapened.

In the accompanying drawings—Figure 1 is a longitudinal section of my hub. Fig. 2 is a front elevation. Fig. 3 is a perspective view of the axle-receiving sleeve, and Fig. 4 is a longitudinal section, showing a modified form in which the axle-receiving sleeve and annular supporting disk are formed in one piece.

Similar letters of reference indicate like parts.

The hub shell comprises a wheel-receiving cylindrical portion A, an outwardly tapered portion B, and a cylindrical threaded portion C for the reception of the usual threaded screw cap. Within the tapered portion B is seated a flat annular flanged disk D which may be retained in place by struck up projections E on the shell entering indentations or recesses formed in the flange of said disk. If desired, the disk flange may also be united to the shell by welding: or the projections E and recesses may be omitted and the union of disk and shell effected by welding only.

In the outer wall of the hub is an opening having a tapered flange F. The annular disk D at its inner periphery and said flange F are suitably recessed to receive the parallel straight flanges G formed on the longitudinal edges of a tapered metal sleeve H, which is seated in the central opening of disk D and in flange F. On the inner end of said sleeve is a flange I. There is an opening between the parallel flanges G which extends through the flange I, in which is received a key J. When the sleeve is in place, the flange I bears against the inner flat face of annular disk D, and may be welded thereto. The key J enters a way cut in the axle K (dotted lines Fig. 1) when said axle is in place in the sleeve. Instead of making the sleeve H in a separate piece, as before described, I may make it integral with disk D, in which case the key-way L will be formed in the circumferential wall of said sleeve, as shown in Fig. 4, instead of between flanges G.

I claim:

1. A metal hub for vehicle wheels, comprising a shell having a cylindrical wheel-receiving portion, an outwardly tapered portion and an outer end wall having an opening, a flat annular disk seated in said tapered portion, and a cylindrical axle-receiving sleeve secured to and extending between the opening in said disk and said wall opening.

2. A metal hub for vehicle wheels, comprising a shell having a cylindrical wheel-receiving portion, an outwardly tapered portion and an outer end wall having an opening, a flat annular disk seated in said tapered portion, an axle-receiving sleeve seated in said disk and wall openings, and a flange on said sleeve seated upon the inner face of said disk.

3. A metal hub for vehicle wheels, comprising a shell having a cylindrical wheel-receiving portion, an outwardly tapered portion and an outer end wall having an opening, a flat annular disk, a circumferential flange on said disk seated in said tapered portion, an axle-receiving sleeve seated in said disk and wall openings, and a flange on said sleeve seated upon the inner face of said disk.

4. A metal hub for vehicle wheels, comprising a shell having a cylindrical wheel-receiving portion, an outwardly tapered portion and an outer end wall having an opening, a flat annular disk seated in said tapered portion, and a cylindrical axle-receiving sleeve secured to and extending between the opening in said disk and said wall opening; there being a key-way formed in the inner peripheries of said disk and wall openings and in said sleeve adapted to receive a key for securing an axle in said openings.

In testimony whereof I have affixed my signature in presence of two witnesses.

THOMAS E. MURRAY.

Witnesses:
 GERTRUDE T. PORTER,
 MAY T. McGARRY.